US010025470B2

(12) United States Patent
Burt (10) Patent No.: US 10,025,470 B2
(45) Date of Patent: Jul. 17, 2018

(54) OBJECTIZING AND ANIMATING IMAGES (71) Applicant: Microsoft Technology Licensing, LLC, Redmond, WA (US)

(72) Inventor: Kimberly Jan Burt, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 922 days.

(21) Appl. No.: 14/453,323

(22) Filed: Aug. 6, 2014

(65) Prior Publication Data
US 2014/0344744 A1 Nov. 20, 2014

Related U.S. Application Data (63) Continuation of application No. 13/218,447, filed on Aug. 26, 2011, now Pat. No. 8,812,980.

(51) Int. Cl.
*G06F 3/048* (2013.01)
*G06F 3/0484* (2013.01)
*G06T 13/20* (2011.01)
*G06F 3/0482* (2013.01)
*G06K 9/00* (2006.01)
*G06T 13/00* (2011.01)

(52) U.S. Cl.
CPC ............ *G06F 3/0484* (2013.01); *G06F 3/048* (2013.01); *G06F 3/0482* (2013.01); *G06F 3/04842* (2013.01); *G06F 3/04845* (2013.01); *G06K 9/00402* (2013.01); *G06T 13/00* (2013.01); *G06T 13/20* (2013.01); *G06T 2200/24* (2013.01)

(58) Field of Classification Search
CPC ...... G06F 3/0484; G06F 3/048; G06F 3/0482; G06F 3/04842; G06F 3/04845; G06K 9/00402; G06T 13/00; G06T 13/20; G06T 2200/24
USPC ......................................... 715/810
See application file for complete search history.

(56) References Cited

U.S. PATENT DOCUMENTS 6,750,919 B1 * 6/2004 Rosser ................... H04N 5/272
348/584
6,754,389 B1    6/2004 Dimitrova et al.
(Continued)

OTHER PUBLICATIONS

Sakaino, Hidetomo, "The Photodynamic Tool: Generation of Animation from a Single Texture Image," Jul. 6-8, 2005, IEEE International Conference on Multimedia and Expo, 4 Pages.
(Continued)

*Primary Examiner* — David Phantana-angkool
(74) *Attorney, Agent, or Firm* — Michael Best & Friedrich LLP (57) ABSTRACT Concepts and technologies are described herein for objectizing and animating images. In accordance with the concepts and technologies disclosed herein, a presentation program is configured to import an image, to analyze the image and/or data describing the image, and to identify entities within the image. The presentation program creates objects corresponding to the identified entities, and program presents the identified entities and/or the created objects via a user interface. The presentation program also can be configured to present one or more user interfaces via which a user selects entities and/or objects and specifies or controls animations of the selected entities or objects.

20 Claims, 7 Drawing Sheets

(56) References Cited

U.S. PATENT DOCUMENTS

| | | |
|---|---|---|
| 7,034,833 B2 | 4/2006 | Epshteyn |
| 7,173,623 B2 | 2/2007 | Calkins et al. |
| 7,197,710 B2 | 3/2007 | Faraday et al. |
| 7,454,077 B1 | 11/2008 | MacKenzie et al. |
| 7,788,605 B1 * | 8/2010 | Shoemaker ............ G11B 27/34 715/726 |
| 7,840,905 B1 * | 11/2010 | Weber ................... G06F 3/0486 715/765 |
| 7,941,758 B2 | 5/2011 | Tremblay |
| 7,956,847 B2 | 6/2011 | Christie |
| 8,144,153 B1 | 3/2012 | Sullivan et al. |
| 8,199,152 B2 | 6/2012 | Sullivan et al. |
| 8,239,785 B2 | 8/2012 | Hinckley et al. |
| 8,286,102 B1 | 10/2012 | Wilensky |
| 8,291,348 B2 | 10/2012 | Duarte et al. |
| 8,456,431 B2 * | 6/2013 | Victor ................... G06F 3/0482 345/173 |
| 8,473,870 B2 | 6/2013 | Hinckley et al. |
| 8,549,087 B2 | 10/2013 | Leonard |
| 8,659,596 B2 * | 2/2014 | Corazza .................. G06T 13/40 345/419 |
| 9,373,185 B2 * | 6/2016 | Taylor ..................... G06T 13/00 |
| 9,508,176 B2 * | 11/2016 | Lucas ..................... G06T 13/20 |
| 9,619,914 B2 * | 4/2017 | de Aguiar ............... G06T 13/20 |
| 9,626,788 B2 * | 4/2017 | Corazza .................. G06T 13/40 |
| 9,798,744 B2 * | 10/2017 | Fagans ............... G06F 17/30277 |
| 2007/0055947 A1 * | 3/2007 | Ostojic ................. G06T 3/0018 715/800 |
| 2008/0170078 A1 | 7/2008 | Sullivan et al. |
| 2008/0170777 A1 | 7/2008 | Sullivan et al. |
| 2013/0215113 A1 * | 8/2013 | Corazza .................. G06T 13/40 345/420 |
| 2014/0137019 A1 * | 5/2014 | Paulsen ................. G06F 3/0486 715/769 |

OTHER PUBLICATIONS

U.S. Official Action dated Aug. 30, 2013 in U.S. Appl. No. 13/218,447.
U.S. Notice of Allowance dated Apr. 14, 2014 in U.S. Appl. No. 13/218,447.

* cited by examiner

OBJECTIZING AND ANIMATING IMAGES

CROSS REFERENCE TO RELATED APPLICATIONS

This patent application is a continuation of copending U.S. application Ser. No. 13/218,447 entitled "Objectizing and Animating Images", which was filed Aug. 26, 2011 and which is expressly incorporated herein in its entirety by reference.

BACKGROUND

Presentation software has become popular for creating and sharing visual and/or audiovisual information. Users often create complex presentations that include text and images for marketing efforts, advertising, lectures, and/or for other purposes. An image is typically imported into the software and stored within a presentation as an object. The image therefore can be manipulated in a manner similar to the manner in which other objects, such as text, are manipulated.

Presentation software has evolved to support animation and other actions that can be performed with respect to objects. Thus, users can animate an image and other objects within a presentation. Because the image is recognized by the presentation software as an object, actions taken with respect to the image must be taken to the image as a whole. If a user wishes to take an action with respect to less than the entire image, the image must be exported from the presentation software to a suitable image editing program. New images can be created within the image editing software, and the new images can then be imported back into the presentation software and again stored as objects. This process can, however, be complicated and time consuming and, as a result, may be frustrating to users.

It is with respect to these and other considerations that the disclosure made herein is presented.

SUMMARY

Concepts and technologies are described herein for objectizing and animating images and portions of images. In accordance with the concepts and technologies disclosed herein, a presentation program is configured to import an image. The presentation program is configured to analyze the image, and/or data describing the image, and to identify entities within the image. An entity can include a component, sub-component, and/or other part or portion of the subject represented by the image. For example, an entity recognized within an image of an automobile may include a wheel, a tire, and the like.

The presentation program also can be configured to objectize the image. As used herein, "objectizing" refers to a process for identifying one or more entities within an image, and converting image data corresponding to the recognized entity into an object. The presentation program can present one or more user interfaces via which users can select objects and specify and/or control animations or other processes for the selected objects. Thus, embodiments of the concepts and technologies disclosed herein allow importation of an image and creation of objects corresponding to entities within the image. As such, users can avoid exporting images from the presentation program to image editing software, creation of new images corresponding to manually defined entities within the image, and importation of the new images into the presentation program.

According to one aspect, an image is received at a presentation program. The presentation program receives a command to objectize the image. In response to the command to objectize the image, the presentation program analyzes the image, identifies entities within the image, and creates objects corresponding to the identified entities. The presentation program can present the identified entities, and/or the created objects, via a user interface.

According to another aspect, the presentation program presents a user interface via which a user selects one or more of the identified entities and/or created objects. The presentation program also can present a user interface for specifying and controlling animations of the selected entities or objects. The presentation program also can be configured to store data associated with the animations. The data can be stored as part of a presentation file, or can be stored separately.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for objectizing and animating images. According to the concepts and technologies described herein, a presentation program is configured to import an image, to analyze the image and/or data describing the image, and to identify entities within the image. An entity can include a component, sub-component, and/or other part or portion of the subject represented by the image. The presentation program also can be configured to objectize the image.

The presentation program can present one or more user interfaces via which users can select objects and specify and/or control animations or other processes for the selected objects. Thus, embodiments of the concepts and technologies disclosed herein allow importation of an image into a presentation program, and creation of objects within the presentation program, wherein the objects correspond to the entities recognized within the image. As such, the entities within the images can be animated without exporting images from the presentation program to image editing software, creating new images corresponding to manually defined entities within the image, and/or importing the new images into the presentation program.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for objectizing and animating images will be presented.

Figure 1:
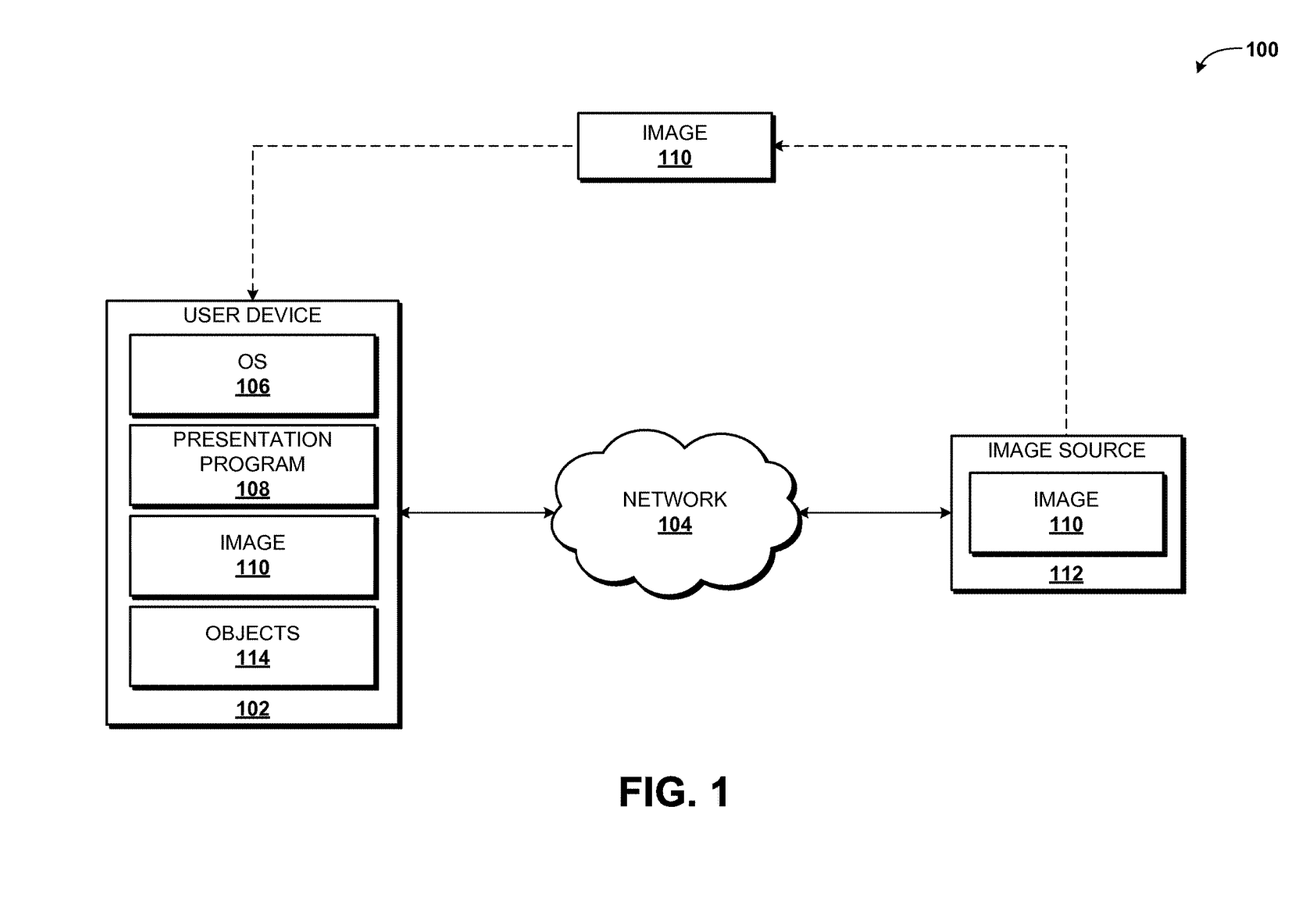
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a user device 102. In some embodiments, the user device 102 operates on or in communication with a communications network ("network") 104, though this is not necessarily the case. According to various embodiments, the functionality of the user device 102 is provided by a personal computer ("PC") such as a desktop, tablet, or laptop computer system. In other embodiments, the functionality of the user device 102 is provided by other types of computing systems including, but not limited to, server computers, handheld computers, netbook computers, embedded computer systems, personal digital assistants, mobile telephones, smart phones, or other computing devices. Thus, while the functionality of the user device 102 is described herein as being provided by a PC, it should be understood that this embodiment is illustrative, and should not be construed as being limiting in any way.

According to various embodiments, the user device 102 is configured to execute an operating system 106 and one or more application programs such as, for example, a presentation program 108 and/or other application programs. The operating system 106 is a computer program for controlling the operation of the user device 102. The application programs are executable programs configured to execute on top of the operating system to provide various functions. The presentation program 108 is an executable program configured to provide an interface for creating, editing, saving, and sharing presentations, as well as providing the functionality described herein for objectizing and animating images.

According to various embodiments, the user device 102 is configured to receive or store an image 110. In some embodiments, the image 110 is stored at the user device 102 in a memory or other suitable data storage device. In the embodiment illustrated in FIG. 1, the image 110 is obtained from an image source 112 that is operating on or in communication with the network 104. The image source 112 can be a networked hard drive, a server computer operating on the network 104 or in communication therewith, and/or any other suitable device. The image 110 is received at and/or imported by the presentation program 108 for use within a presentation and/or for other purposes.

The presentation program 108 is configured to create, view, store, and/or share an electronic presentation such as a slideshow presentation, a movie presentation, an audiovisual presentation, and/or other presentations. According to various embodiments, the functionality of the presentation program 108 is provided by a member of the POWERPOINT family of products from MICROSOFT CORPORATION in Redmond, Wash. In other embodiments, the functionality of the presentation program 108 is provided by a member of the PRESENTATIONS family of products from COREL CORPORATION in Ottawa, Ontario, a member of the IMPRESS family of products from OPENOFFICE.ORG, a member of the PREZI family of products, and/or a member of the KEYNOTE family of products from APPLE CORPORATION in Cupertino, Calif. Because the functionality of the presentation program 108 can be provided by other software packages, it should be understood that these embodiments are illustrative, and should not be construed as being limiting in any way.

In some embodiments, the presentation program 108 is configured to obtain the image 110 and to import the image 110 into a presentation. While typical presentation software treats imported images 110 as graphic data, embodiments of the presentation program 108 disclosed herein are configured to analyze the image 110, identify entities within the image 110, and create objects 114 corresponding to the identified entities within the image 110. Thus, the presentation program 108 disclosed herein is configured to import an image 110 and create objects 114 corresponding to entities within the image 110.

As such, the client device 102 is not required to execute an image editing program. Typically, presentation software is unable to create the objects 114, and instead export the image 110 to an image editing program. Within the image editing program, new images 110 corresponding to one or more entities within the image 110 must be created and exported back to the presentation program 108. These steps of importing/exporting images to and from presentation software and image editing programs are typically manual processes that consume time and computing resources. Thus, embodiments of the concepts and technologies disclosed herein allow elimination of the image editing program, as well as the time and resources associated with recognizing entities within images 110 and/or creating images 110 corresponding to the entities.

According to various embodiments of the concepts and technologies disclosed herein, the presentation program 108 is configured to receive a command to objectize the image 110. As used herein, the term "objectize" is used to refer to a process by which the presentation program 108 analyzes an image 110 to identify one or more entities or components of a subject of the image 110, and creation of objects 114 corresponding to the recognized entities. By way of example, if the image 110 corresponds to a photograph of a galaxy, the presentation program 108 can identify stars, planets, or other bodies in the image of the galaxy as separate entities. The presentation program 108 also can be configured to create objects 114 corresponding to each star, planet, or other body identified.

In another example, the image 110 corresponds to a photograph or drawing of an automobile. The presentation program 108 is configured to identify tires, wheels, doors, windows, door handles, headlights, taillights, windshield wipers, and/or other components of the automobile as entities, and to create objects 114 corresponding to these entities. Because the entities are now associated with objects 114, the presentation program 108 can be used to animate these objects 114. As such, the wheels of a car can be rotated, for example, without exporting the image of the car to an image editing program and creating a new image of the wheel that is then imported into the presentation program 108. It should be understood that these embodiments are illustrative, and should not be construed as being limiting in any way.

The presentation program 108 is further configured to present the objects 114 created by the presentation program 108 to a user or other entity for various purposes. According to some embodiments, the presentation program 108 is configured to present a UI via which animations of the objects 114 can be specified and/or controlled by the user. In some embodiments, as will be described below with reference to FIGS. 3A-3D, the presentation program 108 generates and/or presents one or more UIs for presenting the identified objects 114, for specifying and/or controlling animations associated with the identified objects 114, and/or for other purposes. Thus, according to some embodiments of the concepts and technologies disclosed herein, the presentation program 108 is configured to allow users to create and animate objects 114 corresponding to entities within images 110 without making use of an image editing program. These and other features of the presentation program will be described in more detail herein with reference to FIGS. 2-3D.

While FIG. 1 illustrates the image 110 and the objects 114 as separate entities, it can be appreciated from the description herein that the image 110 and the objects 114 can be stored as application data associated with the presentation program 108, if desired. For example, the image 110 and/or the objects 114 can be stored as part of, or associated with, a presentation or other file. Thus, the illustrated embodiment should be understood as being illustrative, and should not be construed as being limiting in any way.

FIG. 1 illustrates one user device 102, one network 104, and one image source 112. It should be understood, however, that some implementations of the operating environment 100 include multiple user devices 102, multiple networks 104, and no or multiple image sources 112. Thus, the illustrated embodiments should be understood as being exemplary, and should not be construed as being limiting in any way.

Figure 2:
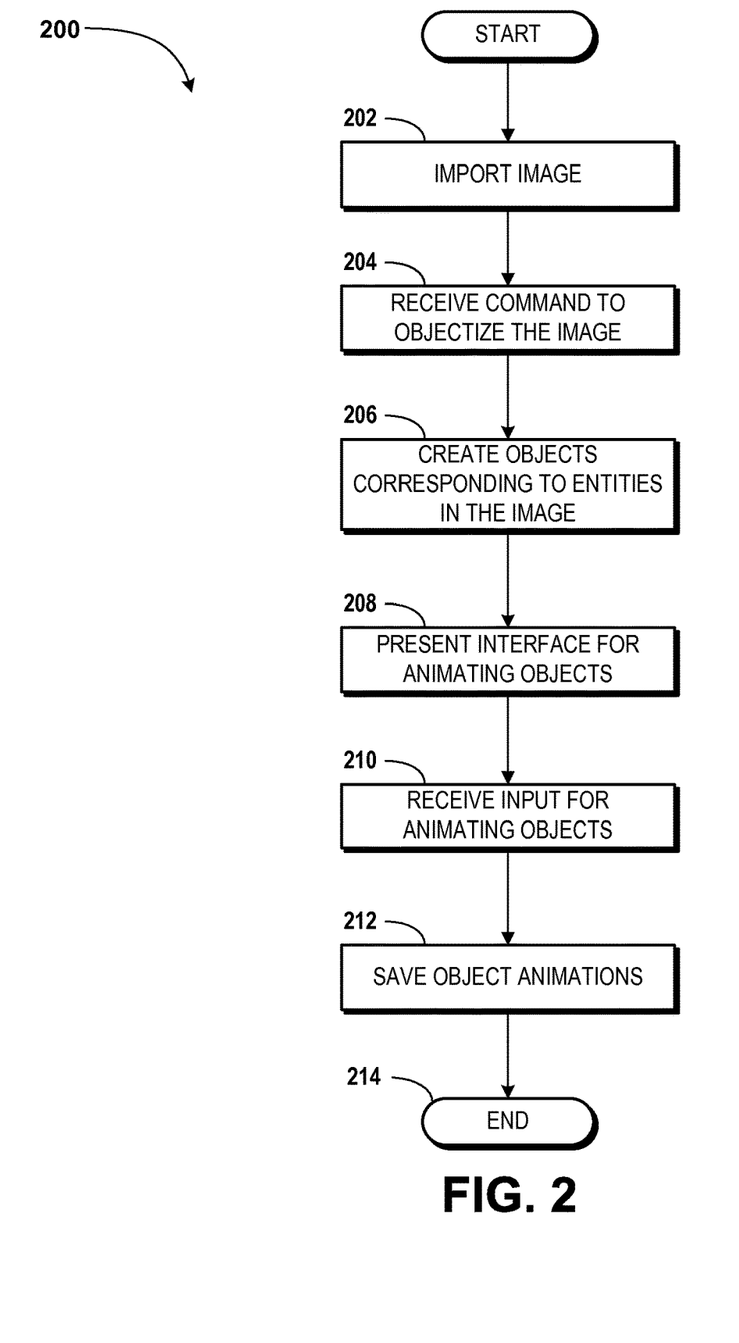
FIG. 2 is a flow diagram showing aspects of a method for objectizing and animating images, according to an exemplary embodiment.

Turning now to FIG. 2, aspects of a method 200 for objectizing and animating images 110 will be described in detail. It should be understood that the operations of the method 200 are not necessarily presented in any particular order and that performance of some or all of the operations in an alternative order(s) is possible and contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by the presentation program 108, which has been described herein as being executed in some embodiments by the user device 102. It should be understood that these embodiments are exemplary, and should not be viewed as being limiting in any way. In particular, other devices in addition to or instead of the user device 102 can provide the functionality described herein by execution of any suitable program in addition to, or instead of, the presentation program 108.

The method 200 begins at operation 202, wherein an image 110 is imported by the presentation program 108. According to various implementations of the concepts and technologies disclosed herein, the image 110 can correspond to any type of image or other graphical information. Thus, the image 110 can be stored in any desired format including, but not limited to open and/or proprietary image formats. According to some embodiments, the image 110 is a photograph or other type of visual information. As such, some embodiments of the presentation program 108 are configured to recognize the image 110 as a single object 114. In particular, as is generally understood, objects 114 created or imported into the presentation program 108 such as images 110, text, clip art, and the like, can be worked with and can be recognized by the presentation program 108 as objects 114. These objects can be modified and/or manipulated using various operations. Because images 110 are treated as single objects 114 by the presentation program, only the entire image 110 can be manipulated as an object 114. According to various embodiments of the concepts and technologies disclosed herein, however, the presentation program 108 is configured to recognize entities within the image 110, and to create objects 114 corresponding to the recognized entities. These and other features of the presentation program 108 disclosed herein will be described in more detail below.

In operation 202, the image 110 is imported by the presentation program 108 in response to one or more user commands. For example, a user may select an option to import the image 110. In response to the command to import the image 110, the presentation program 108 can import the image 110 in a format appropriate for the presentation program 108 such as a bitmap image, a jpeg image, a gif image, a png image, and/or as graphics data in any other suitable format. The presentation program 108 can recognize the image 110 as graphical information and may treat the entire image 110 as a single object 114.

According to various implementations, the image 110 is obtained from storage at the user device 102. In other embodiments, the image 110 is stored at a remote storage location such as the image source 112 described herein. As such, it should be understood that the image 110 can be obtained from any suitable location and imported into the presentation program 108 via a direct connection, via one or more networks, and/or via other suitable entities, devices, and/or device components.

From operation 202, the method 200 proceeds to operation 204, wherein the presentation program 108 receives a command to objectize the image 110. As used herein, a command to objectize the image 110 corresponds to a command to recognize entities within the image 110 and to create objects 114 corresponding to the graphical data associated with these recognized entities. As such, the presentation program 108 is configured to recognize entities within the image 110, and to create objects 114 corresponding to these entities to allow a user to work with the graphical data corresponding to the entities within the presentation program 108. An example UI for receiving the command to objectize the image 110 is illustrated and described below with reference to FIG. 3A.

From operation 204, the method 200 proceeds to operation 206, wherein the presentation program 108 creates objects 114 corresponding to the entities recognized within the image 110. As noted above, the objects 114 can correspond to graphical data associated with entities within the image 110. For example, if the image 110 corresponds to a house, the presentation program 108 may recognize doors, windows, and/or other entities within the image 110 and can create objects 114 corresponding to these entities. Similarly, if the image 110 corresponds to an automobile, the presentation program 108 can recognize the tires, wheels, door handles, windows, windshield wipers, and/or other entities within the image 110 and can create objects 114 corresponding to these entities. Other examples of entities or components of an image 110 are contemplated but are not described herein in additional detail.

The recognition of entities within an image 110 can be accomplished by the presentation program 108 via a number of processes. In some embodiments, for example, the presentation program 108 presents a user interface ("UI") to allow a user to specify the entities in the image 110. For example, a user may select, via the UI, a planet within an image 110 of a solar system, a star within an image 110 of a galaxy, a button within an image 110 of a keyboard, and/or another entity within an image 110. In response to the selection of the entity by the user, and in some embodiments input indicating that the entity is to be converted into an object 114, the presentation program 108 converts the graphical data corresponding to the entity into an object 114. It should be understood that these embodiments are illustrative, and should not be construed as being limiting in any way.

In other embodiments, the presentation program 108 is configured to automatically detect entities in an image 110 and present the identified entities to a user. According to various implementations, the presentation program 108 can include various modules for identifying the entities within the image 110. The modules can include, for example, an edge detection module for identifying edges of an entity captured in the image 110, a color difference recognition module for recognizing color differences, and hence the presence of entities, within the image, and/or other modules.

Because objects depicted in the image 110 can be oriented in various orientations relative to a camera or artist viewpoint, the presentation program 108 can have extensive libraries for identifying objects in the image 110. These libraries can be updated at any time and/or can be linked to various other object libraries to improve the functionality of the presentation program 108 for recognizing objects in the image 110. Thus, for example, if a picture of a car is oriented at a three-quarter or other perspective view, or if the wheels of the car are turned toward the camera or artist viewpoint, the presentation program 108 can nonetheless be configured to recognize the wheels based upon a context of the image 110 and/or colors, patterns, edges, or other aspects of the image 110. Thus, the scope of the object-recognition functionality of the presentation program 108 disclosed herein is not limited in any way by orientation, color, and/or other aspects of objects in the image 110.

In some embodiments, the presentation program 108 is configured to analyze metadata associated with the image 110 and/or to perform image recognition processes on the image 110 instead of, or in addition to, using one or more of the above-mentioned modules or other modules to recognize entities within the image 110. Thus, the presentation program 108 can use the metadata or image recognition processes to create an expected set of entities within the image 110. For example, if metadata or image recognition suggests that the image 110 includes a person, the presentation program 108 can determine that expected entities within the image 110 include eyes, a mouth, a nose, ears, and the like. Similarly, if metadata or image recognition processes suggest that the image 110 includes an automobile, the presentation program 108 can determine that expected entities within the image 110 include tires, wheels, door handles, windows, and the like. It should be understood that these embodiments are illustrative, and should not be construed as being limiting in any way. An example UI for presenting the identified objects 114 to a user is illustrated and described below with reference to FIG. 3B.

From operation 206, the method 200 proceeds to operation 208, wherein the presentation program 108 presents a UI for allowing a user to specify and control one or more animations for the one or more of the objects 114 identified in operation 206. The UI presented in operation 208 can include UI controls for selecting identified objects 114 and/or for specifying and controlling animations associated with the selected objects 114. Two example UIs for controlling animation of the objects 114 are illustrated and described below with reference to FIGS. 3C-3D.

From operation 208, the method 200 proceeds to operation 210, wherein the presentation program 108 receives input for animating the objects 114. As explained above with reference to operation 208, the input received in operation 210 can correspond to input identifying the objects 114 that are to be animated, as well as animation controls relating to the selected objects 114. The example UIs shown in FIGS. 3C-3D can be used to receive the input from the user, and will be described in more detail below. It should be understood that operation 210 can be repeated for any number of objects 114 and/or animations applied to the respective objects 114. Thus, operation 210 of the method 200 can be iterated any number of times, if desired.

From operation 210, the method 200 proceeds to operation 212, wherein the presentation program 108 saves the object animations specified in operation 210. Data describing the object animations can be stored as part of the presentation, if desired, or can be stored separately from the presentation data. From operation 212, the method 200 proceeds to operation 214. The method 200 ends at operation 214.

Figure 3A:
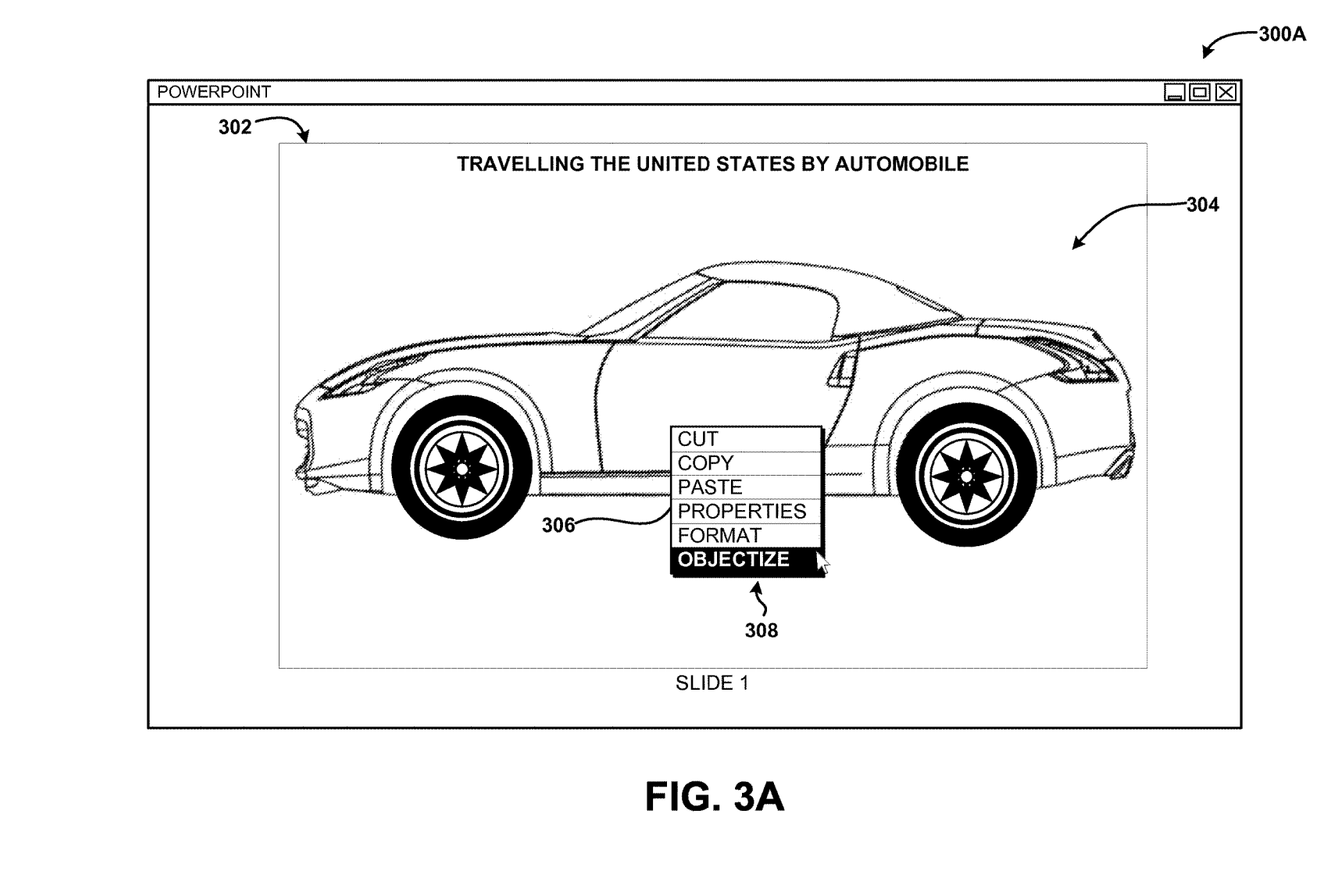
FIGS. 3A-3D are user interface diagrams showing aspects of illustrative user interfaces for objectizing and animating images, according to various embodiments.

Turning now to FIG. 3A, a UI diagram showing aspects of a UI for objectizing and animating images in some embodiments will be described. As explained above with regard to FIG. 2, the UI illustrated in FIG. 3A can be, but is not necessarily, presented in operation 204 of the method 200. In particular, FIG. 3A shows a screen display 300A generated by the presentation program 108 for generating a presentation such as a slide show, a movie presentation, an audiovisual presentation, and/or other types of presentations. It should be appreciated that the UI diagram illustrated in FIG. 3A is illustrative of one contemplated embodiment, and therefore should not be construed as being limited in any way.

In the illustrated embodiment, the screen display 300A is configured to present an interface for creating slides of a slide show presentation. An example slide 302 is shown in FIG. 3A. It can be appreciated that various menus, icons, command ribbons, and/or other UIs for controlling the functionality of the presentation program 108 can be presented on the screen display 300A, although these and other aspects of the presentation program 108 are not illustrated in FIG. 3A. In the example slide 302, an image 304 has been imported, for example during the operation 202 of the method 200 illustrated in FIG. 2. Of course, the image 304 shown in FIG. 3A is illustrative, and should not be construed as being limited in any way.

As discussed above with reference to operation 204 of the method 200 illustrated in FIG. 2, the presentation program 108 can receive a command to objectize an image 110 such as the image 304 imported into the presentation program 108. The command received in operation 204 can be received in any suitable manner. In the embodiment illustrated in FIG. 3A, the command to objectize the image 304 is received by the presentation program 108 via a gesture such as a mouse hover action, a mouse button click, a voice command, a touch gesture, a gesture in free space, a keyboard command, and/or another action. In response to the gesture, the presentation program 108 is configured to display an image menu 306. In the illustrated embodiment, the user has right-click input with a mouse or other input device, and the image menu 306 is displayed in response thereto. Because other forms of input are contemplated, the illustrated embodiment should be understood as being illustrative, and should not be construed as being limited in any way.

In particular, in some embodiments, the presentation program 108 is executed by a device that uses other input devices for interfacing with users. For example, the presentation program 108 can be executed on a smartphone, a tablet device, or other device that uses a touch screen, a stylus, keyboard-only commands, voice commands, and/or other input to interact with the presentation program 108. As such, the image menu 306 shown in FIG. 3A can also be displayed in response to a touch gesture, a multi-touch gesture, a voice command such as "image menu," a stylus touch over a UI control for displaying the image menu 306 and/or other commands or inputs.

The image menu 306 includes various actions that can be taken with respect to the image 304. The illustrated image menu 306 includes options for cutting, copying, and/or pasting the image 304, accessing properties for the image 304, and/or formatting the image 304. The image menu 306 also includes an option 308 for objectizing the image 304. In the illustrated embodiment, a user has hovered a mouse pointer over or near the option 308 for objectizing the image 304, and the option 308 is therefore illustrated as highlighted or selected. If the user selects the option 308, the presentation program 108 can objectize the image 304, as described above with reference to FIG. 2.

As noted above, other input devices are contemplated, so the hovering of the mouse pointer over or near the option 308 should be understood as being illustrative. A user can select the option 308 by speaking a voice command, by touching a touch or multi-touch screen, by entering a keystroke or combination of keystrokes, and/or by entering other inputs or commands. As such, it should be understood that the illustrated embodiment is illustrative, and should not be construed as being limiting in any way.

Figure 3B:
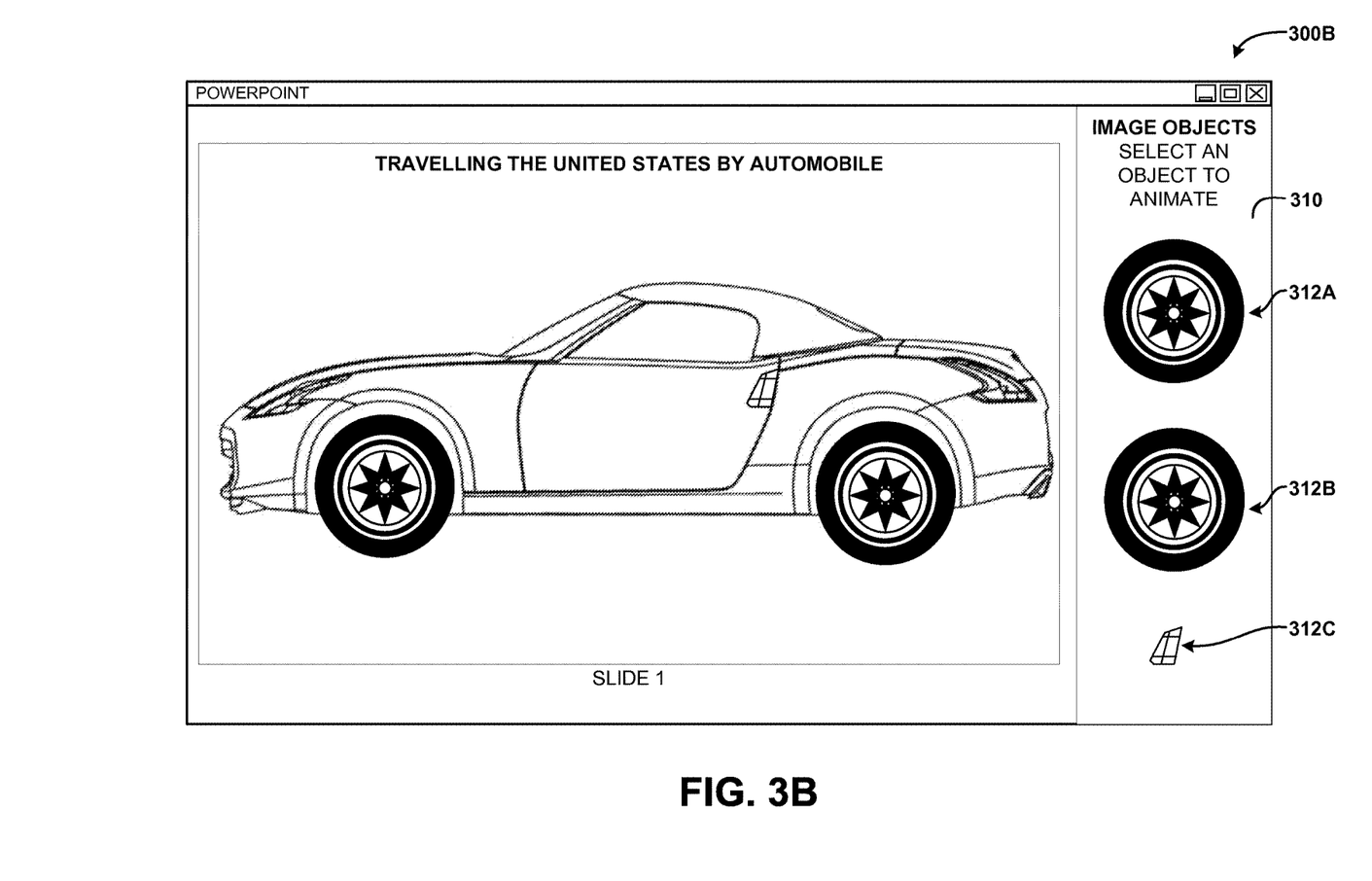

Referring now to FIG. 3B, a UI diagram showing additional aspects of a UI for objectizing and animating images in some embodiments is described in detail. As explained above with regard to FIG. 2, the UI illustrated in FIG. 3B can be, but is not necessarily, presented in operation 208 of the method 200, if desired. For example, the user can select the option 308 shown in FIG. 3A, and the presentation program 108 can objectize the image 304 in response thereto. The presentation program 108 also can be configured to generate the UI illustrated in FIG. 3B for presenting the recognized objects 114. It should be understood that this embodiment is illustrative, and should not be construed as being limiting in any way.

FIG. 3B shows a screen display 300B generated by the user device 102 to present a UI for presenting objects 114 recognized in the image 304. In the illustrated embodiment, the screen display 300B includes an identified objects area 310 for presenting objects 312A-C (hereinafter generically and/or collectively referred to as objects 312). In the example embodiment shown in FIG. 3B, the identified objects 312 include a front wheel 312A, a rear wheel 312B, and a door handle 312C. Although not shown in FIG. 3B, additional and/or alternative objects 312 recognized in the image 304 can be displayed in the identified objects area 310 and accessed using a slider bar or other UI control for scrolling or otherwise accessing other non-displayed space associated with the identified objects area 310. Also, as noted above, a user can use touch commands such as finger or stylus touches or swipes, voice commands, and/or other input to access non-displayed space instead of, or in addition to, a slider bar or other UI control. Thus, the described and illustrated embodiments should understood as being illustrative and should not be construed as being limited in any way.

Figure 3C:
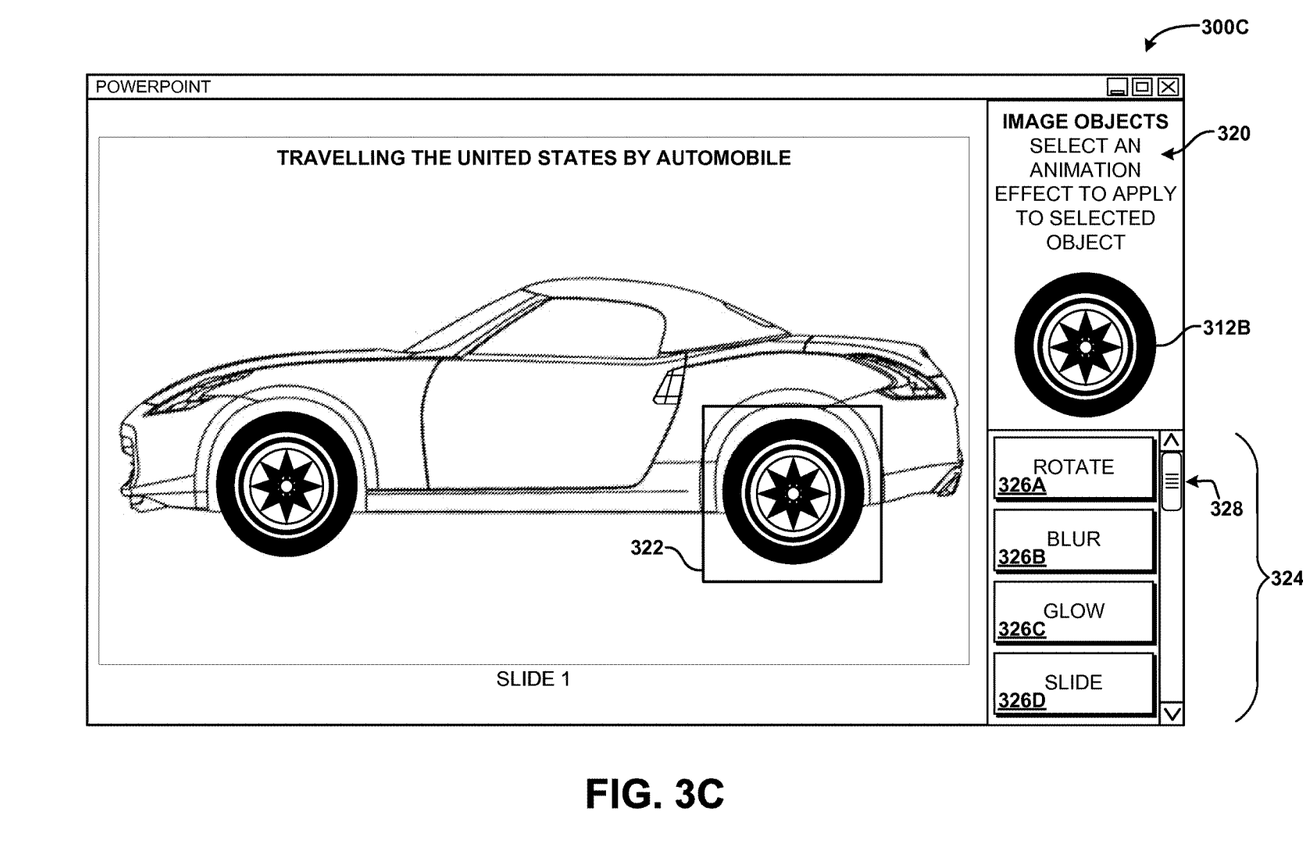
Figure 3D:
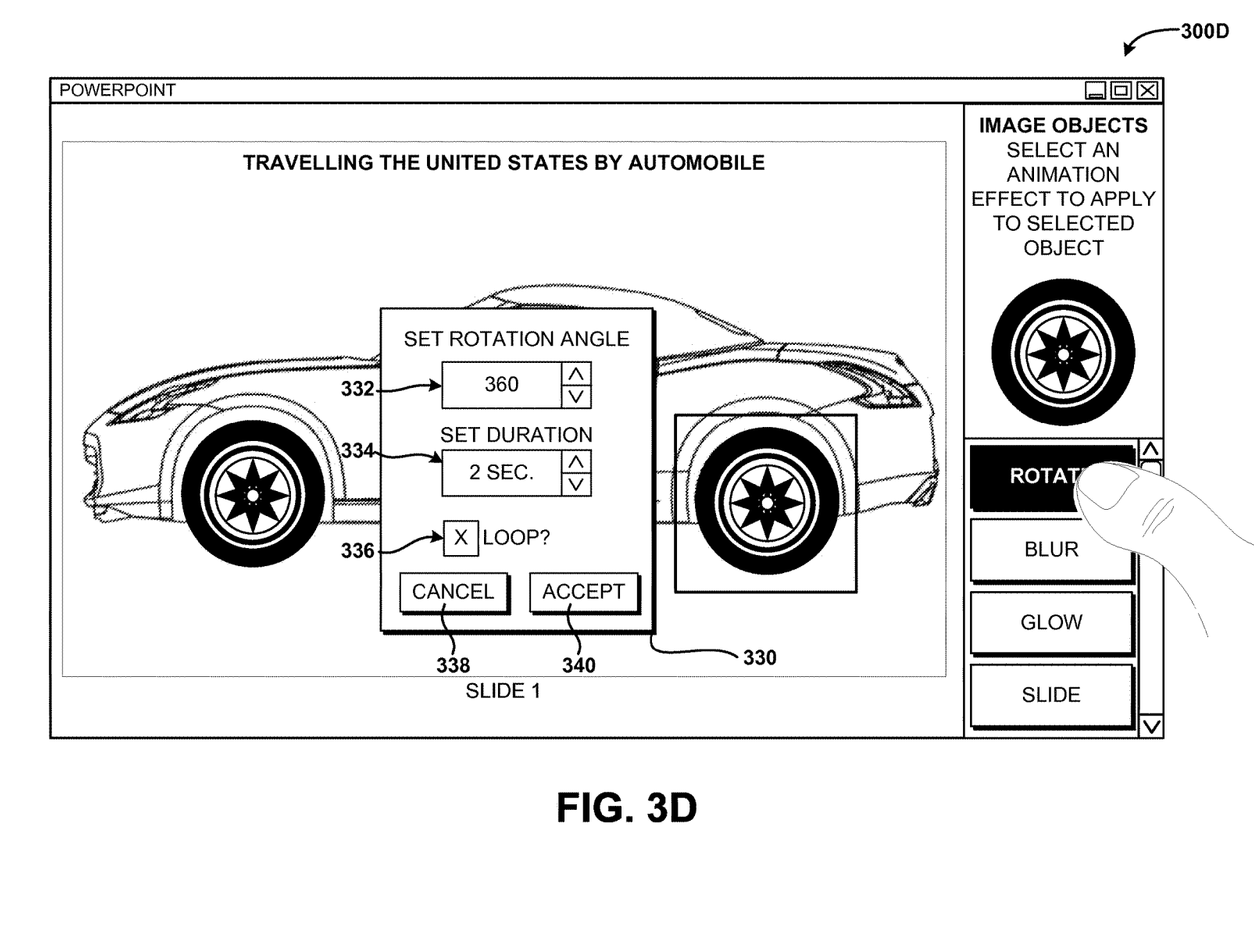

A user can select one or more of the objects 312 and thereby access one or more menus for animating the selected objects 312, as will be explained in more detail with reference to FIGS. 3C-3D. For purposes of illustrating the concepts and technologies disclosed herein, FIGS. 3C-3D are described as being presented in response to a user selecting the rear wheel 312B. It should be understood that this embodiment is illustrative, and should not be construed as being limiting in any way.

Referring now to FIG. 3C, a UI diagram showing additional aspects of a UI for objectizing and animating images 110 in some embodiments is described in detail. As explained above with regard to FIG. 2, the UI illustrated in FIG. 3C can be, but is not necessarily, presented in operations 208-210 of the method 200. In the illustrated example, the user has selected the object 312B in FIG. 3B, and the presentation program 108 presents the UI illustrated in FIG.

3C in response to the selection. It should be understood that this embodiment is illustrative, and should not be construed as being limiting in any way.

FIG. 3C shows a screen display 300C generated by the presentation program 108 to provide an interface for animating the selected object 312B. In the illustrated embodiment, the screen display 300C includes a selected object area 320, which displays the object 312B selected by the user. The screen display 300C also provides an indication 322 for identifying to the user the selected object 312B within the image 304. It should be understood that the indication 322 can help a user identify the selected object 312B in context with respect to the remainder of the image 304. In some embodiments, the indication 322 is helpful for users, particularly in cases in which multiple similar or identical objects 312 relate to an image 304.

While a box is used as the indication 322, other embodiments are possible and contemplated. For example, in some embodiments, the selected object 312B is displayed in its location within the image 304, and the remainder of the image 304 is displayed at a reduced brightness or contrast. In other embodiments, only the selected object 312B is displayed and the remainder of the image 304 is hidden from view. Other embodiments are possible and are contemplated. As such, it should be understood that the illustrated embodiment is illustrative of one contemplated embodiment, and should not be construed as being limiting in any way.

The screen display 300C also shows an object animation menu 324. The object animation menu 324 includes UI controls 326A-D for applying animations to the selected object 312B. The object animation menu 324 also includes a UI control 328 for accessing additional or alternative UI controls (not shown) for animating the selected object 312B. As noted above, various controls and input devices can be used to control various aspects of the presentation program 108. Thus, while the UI controls 326, 328 are shown as rectangular icons, it should be understood that other types of UI controls 326, 328 and/or other methods of issuing commands can be used to control the presentation program 108. As such, it should be understood that the illustrated embodiments are illustrative, and should not be construed as being limiting in any way.

In response to selecting one of the UI controls 326, or entering a command or input via any other suitable device or manner, the presentation program 108 can provide animation options. Thus, a user can access animation options that can be set with respect to the selected object 312B. An example UI for setting animation options with respect to selected objects 312 is illustrated and described below with reference to FIG. 3D. It should be understood that various embodiments for setting animation options are possible and are contemplated, and that as such, the UI shown in FIG. 3D is illustrative.

In some embodiments, a user selects one or more of the objects 312 by dragging and dropping representations of the objects 312 into the slide 302. The dragging and dropping can be accomplished by manipulating a mouse and mouse button, by entering keystroke commands, by using a finger or stylus to select and/or drag the objects 312, and/or via other types of input. Thus, in some embodiments, the user can select a representation of the object 312 within the area occupied by the slide 302 instead of, or in addition to, selecting the objects 312 displayed in the identified objects area 310 show in FIG. 3B and/or the selected object area 320 shown in FIG. 3C. As such, the embodiments described herein with reference to FIGS. 3A-3D should be understood as being illustrative, and should not be construed as being limiting in any way.

FIG. 3D shows a screen display 300D generated by the presentation program 108 for setting animation options for the selected object 312B. In the illustrated embodiment, the screen display 300D includes an object animation option window 330 for displaying animation options associated with a chosen animation. As shown in FIG. 3D, the object animation option window 330 can be displayed, for example, in response to a touch command entered by a user and/or in response to any other input or commands. In the illustrated example, the illustrated object animation option window 330 includes various options for rotating the selected object 312B, and the various options have been presented in response to selection of the UI control 326A corresponding to a rotation animation. As such, the UI control 326A is shown as having been selected. It should be understood that this embodiment is illustrative, and should not be construed as being limiting in any way. Furthermore, it should be understood that any effects and/or types of effects can be provided within the object animation option window 330, and that the options are not limited to the illustrated options.

The object animation option window 330 includes a UI control 332 for setting a rotation angle for the selected object 312B. The object animation option window 330 also includes a UI control 334 for setting an animation duration. In the illustrated example, the user has specified a rotation angle of three hundred sixty degrees, and that the three hundred sixty degree rotation is to be completed in two seconds. It should be understood that this embodiment is illustrative, and should not be construed as being limiting in any way.

The object animation option window 330 also includes a UI control 336 for looping the animation associated with the selected object 312B. If the UI control 336 is selected, the presentation program 108 can be configured to replay the animation a set number of times or infinitely until the slide is advanced or other similar actions are taken with respect to other types of presentations. Thus, in the illustrated embodiment, the object 312B can be rotated three hundred sixty degrees every two seconds if the UI control 336 corresponding to the loop feature is selected. Although not shown in FIG. 3D, the object animation option window 330 also can include a UI control for inputting a number of times the animation is to be played or repeated. Other options are possible and are contemplated.

A user or other entity can select the UI control 338 for cancelling the animation of the selected object 312B and/or the UI control 340 for accepting the animation of the selected object 312B. If the UI control 340 is selected, the presentation program 108 can be configured to store data describing or specifying the animations configured by the user, as described above with reference to operation 212 of FIG. 2. If the UI control 338 is selected, data describing the animations can be discarded. As such, the presentation program 108 is configured to provide various UIs for importing an image 110 into the presentation program 108, identifying entities within the image 110, creating objects 114 corresponding to the entities, and receiving and storing data for animating the created objects 114.

Figure 4:
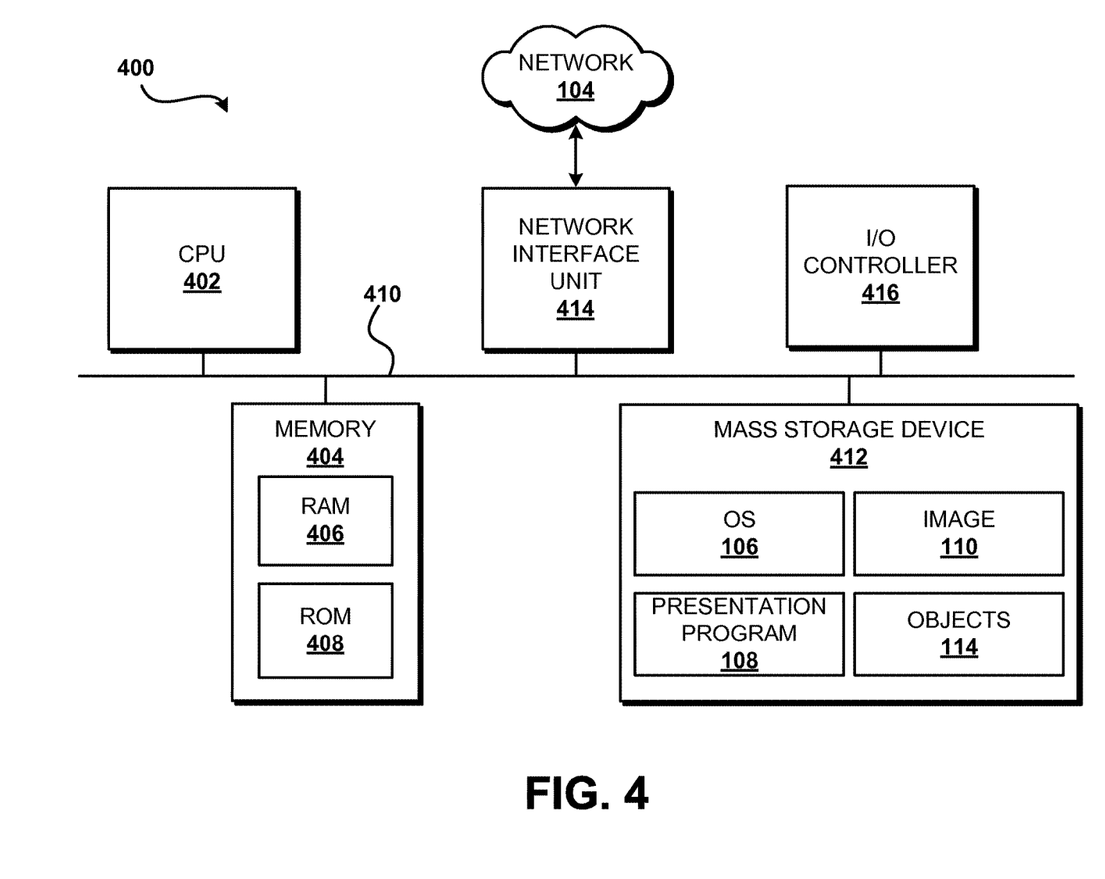
FIG. 4 is a computer architecture diagram illustrating an illustrative computer hardware and software architecture for a computing system capable of implementing aspects of the embodiments presented herein.

FIG. 4 illustrates an exemplary computer architecture 400 for a device capable of executing the software components described herein for objectizing and animating images. Thus, the computer architecture 400 illustrated in FIG. 4 illustrates an architecture for a server computer, mobile phone, a PDA, a smart phone, a desktop computer, a netbook computer, a tablet computer, a laptop computer, and/or other suitable computing devices. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and the presentation program 108. In some embodiments, the mass storage device 412 also can be configured to store the image 110 and/or the objects 114.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, the image source 112 and/or other entities, if desired. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

In some embodiments, some, all, or none of the elements of the computer architecture 400 illustrated and described herein are provided by one or more virtual computing resources and/or distributed computing resources. Thus, the computer architecture 400 can correspond to resources operating or executing on a network such as the network 104. In some embodiments, for example, the functionality of the CPU 402 can be provided by a processing resource provided by one or more server computers executing on a network, and the functionality of the system memory 404 can be provided by one or more network storage devices such as, for example, a datastore, a server computer, and/or other devices. As such, it should be understood that virtual computing resources or other distributed computing environments can execute any aspects of the software components disclosed herein.

Based on the foregoing, it should be appreciated that technologies for objectizing and animating images have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for animating objects within an image, the computer-implemented method comprising performing computer-implemented operations for:
   receiving a command to objectize the image;
   recognizing an entity within the image;
   creating an object corresponding to the recognized entity and overlaying the object on the recognized entity within the image;
   receiving input for animating the object via a menu providing a plurality of options for animating the object; and
   applying an animation to the object within the image by manipulating data describing the animation, wherein the data describing the animation is based on the input.

2. The method of claim 1, further comprising presenting a user interface comprising a user interface control for objectizing the image, the selection of which causes a computing device to objectize the image.

3. The method of claim 2, wherein recognizing the entity within the image is performed in response to selection of the user interface control.

4. The method of claim 1, wherein the entity comprises a portion of the image.

5. The method of claim 1, wherein recognizing the entity comprises:
   analyzing metadata describing the image;
   determining expected entities within the image, based at least partially upon the metadata describing the image;
   searching the image for the expected entities; and
   identifying at least one of the expected entities within the image.

6. The method of claim 1, wherein recognizing the entity comprises:
   performing an image recognition process on the image;
   determining expected entities within the image, based at least partially upon the image recognition process;
   searching the image for the expected entities; and
   identifying at least one of the expected entities within the image.

7. The method of claim 1, wherein recognizing the entity comprises at least one of
   recognizing an entity within the image based upon an edge recognition process, or
   recognizing an entity within the image based upon a color difference recognition process.

8. The method of claim 1, wherein recognizing the entity comprises:
   presenting a user interface for selecting a portion of the image; and
   receiving user input for identifying the portion of the image.

9. The method of claim 1, further comprising:
   presenting a user interface for allowing selection of the created object; and
   receiving, via the user interface, a command for selecting the created object.

10. The method of claim 9, further comprising:
    presenting a user interface control for controlling an animation associated with the selected object;
    detecting manipulation of the user interface control; and
    modifying animation of the created object, in response to detecting the manipulation of the user interface control.

11. A computer-implemented method for animating objects within an image, the computer-implemented method comprising performing computer-implemented operations for:
    receiving, at a computing device, a command to objectize the image;
    in response to the command to objectize the image, analyzing metadata describing the image to recognize an entity within the image, the entity comprising a portion of the image;
    creating an object corresponding to the entity within the image;
    presenting a user interface for receiving input for selecting the object;
    presenting a further user interface for receiving input for animating the object; and
    storing data for animating the object within the image based, at least partially, upon input received via the further user interface.

12. The method of claim 11, further comprising presenting a user interface control, the selection of which causes the computing device to objectize the image, wherein recognizing the entity within the image—is performed in response to selection of the user interface control.

13. The method of claim 11, wherein analyzing the metadata describing the image to recognize the entity comprises:
    determining expected entities within the image, based at least partially upon the metadata describing the image;
    searching the image for the expected entities; and
    identifying at least one of the expected entities within the image.

14. The method of claim 11, wherein recognizing the entity comprises recognizing an entity within the image based upon one or more of an edge recognition process or a color difference recognition process.

15. The method of claim 11, further comprising:
presenting a user interface control for selecting the created object; and
receiving, via manipulation of the user interface, a command for selecting the created object.

16. The method of claim 15, further comprising:
presenting a further user interface control for controlling an animation associated with the selected object;
detecting manipulation of the user interface control; and
modifying animation of the created object, in response to detecting the manipulation of the user interface control.

17. A computer storage medium having computer readable instructions stored thereupon that, when executed by a computer, cause the computer to:
present a user interface control, the selection of which causes the computer to objectize an image;
receive, at the computer, selection of the user interface control for objectizing the image;
in response to receiving selection of the user interface control for objectizing the image, analyze the image to identify an entity within the image, the entity comprising a portion of the image;
recognize the entity within the image;
create an object corresponding to the recognized entity and overlay the object on the recognized entity within the image;
present a user interface for receiving input for selecting the object;
present a further user interface for receiving input for animating the object the further user interface including a menu providing a plurality of options for animating the object; and
store data for animating the object within the image based, at least partially, upon input received via the further user interface.

18. The computer storage medium of claim 17, wherein recognizing the entity comprises recognizing an entity within the image based upon one or more of an edge recognition process or a color difference recognition process.

19. The computer storage medium of claim 17, further comprising computer executable instructions that, when executed by the computer, cause the computer to:
present a user interface control for selecting the created object; and
receive, via manipulation of the user interface, a command for selecting the created object.

20. The computer storage medium of claim 19, further comprising computer executable instructions that, when executed by the computer, cause the computer to:
present a further user interface control for controlling an animation associated with the selected object;
detect manipulation of the user interface control; and
modify animation of the created object, in response to detecting the manipulation of the user interface control.

* * * * *